Figure 1:
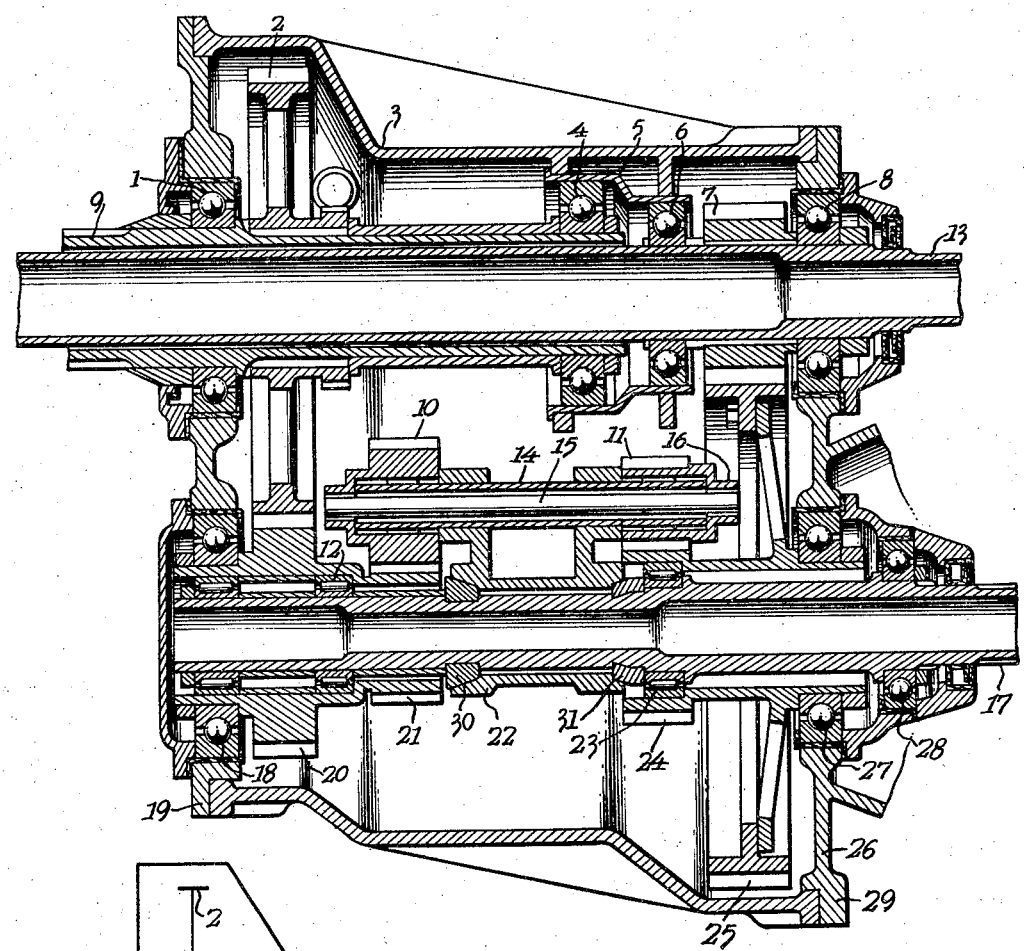

June 22, 1943.  P. E. MERCIER  2,322,247
AIRCRAFT PROPELLER DRIVE
Filed Jan. 25, 1941

INVENTOR,
PIERRE ERNEST MERCIER
by Haseltine, Lake & Co.
ATTORNEYS.

Patented June 22, 1943

2,322,247

UNITED STATES PATENT OFFICE 2,322,247

AIRCRAFT PROPELLER DRIVE

Pierre Ernest Mercier, New York, N. Y., assignor to Helfeda S. A., Geneva, Switzerland, a corporation of Switzerland Application January 25, 1941, Serial No. 375,907
In France October 25, 1940

8 Claims. (Cl. 74—306)

This invention relates to airscrew systems including two coaxial airscrews having a balanced reaction couple and driven through planetary gearing by a drive shaft distinct from and parallel with the shaft of the two airscrews.

The main object of my invention is to simplify the construction and in a very direct and efficient manner produce a planetary drive system for airscrews having a well balanced reaction couple which is free from any fixed reaction point upon the engine or the casing containing the gearing forming the planetary drive system.

Another object is to have such a system which includes an elastic or resilient connection between the gears therein, and also to be in a position to use simple spur gears throughout the system, if desired.

Further objects and the various advantages inherent in the nature and construction of the invention, and accruing from its use will appear more fully as this specification proceeds.

A certain number of reducing gears for coaxial propellers are known which automatically balance moments transmitted to the driven propellers. In this connection it may be stated that the present case is in the nature of an improvement over the airscrew systems disclosed in my U. S. Patent No. 2,228,638, dated January 14, 1941, and in my U. S. Patent No. 2,276,663, dated March 17, 1942.

As already intimated, the invention herein relates to an original solution of the same problem of balancing the moments or reaction couples involved in the systems of the mentioned prior cases, and is particularly characterized by having the drive shaft of the reduction gear and the coaxial propeller shafts distinct and parallel, with the system of gears involved which ensure the transmission and the distribution of the forces centered on these two shafts, any point of reaction or fixed support for the torque being wholly eliminated.

Besides the planetary gears which are found in this transmission, the system is provided with what may be termed twin gears connected by a resilient or elastic connection. Apart from the simplicity with which it can be machined, as already stated the assemblage need only have normal spurgears. The stagger between the propeller shaft and the drive shaft allows the pitch change control of the farthest propeller to pass through a recess of the corresponding shaft, while the elasticity of the connection introduced between the twin pinions of the planetary systems ensures a uniform distribution of load between the planetary gears and protects the crank shaft by lowering the frequency and persistence of the torsional oscillations of the system formed by the propellers and the crank shaft.

The invention will be better understood by means of the accompanying figures of the drawing and the specification hereinafter relating thereto, which represent a practical form of embodiment, by way of a non-limitative example of such a reducing device.

Figure 2:
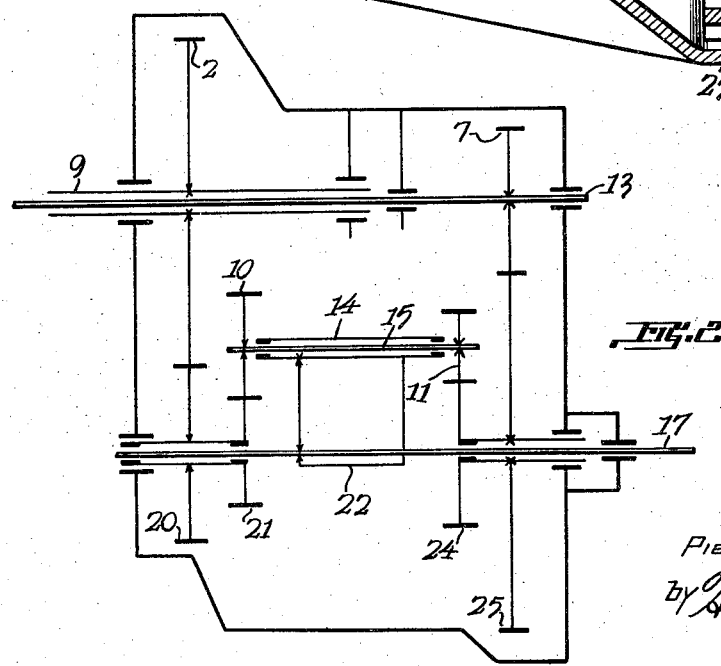

In the drawing herewith,

Figure 1 is a longitudinal section through the entire apparatus including shafts, gears, satellite carrier and casing, etc., of this invention, disclosing substantially the total essential detail and features thereof, while Figure 2 is a diagrammatic representation of the same apparatus for the purpose of emphasizing certain characteristics, features and advantages.

In both views the same references indicate the same parts.

In the practice of my invention, a drive shaft 17 is rigid or integral with a satellite carrier for an intermediate gear couple to be described, which carrier is formed by a bracket body 22 with a fixed bushing 14 thereon forming a support for the intermediate gears 10 and 11, these intermediate gears being journaled on bushing 14 and integrally connected by means of one or more torsion rods 15. Upon each end of the torsion rod 15 which rotates freely within bushing 14 is fixedly secured a cap 16 which in turn is secured rigidly to the respectively adjacent pinion 10 or 11, so that these pinions are resiliently connected so as to rotate together upon said bushing. On the other hand, the bracket body 22 is held in place on shaft 17 by means of two wedging collars or rings 30 and 31, or in any other desired manner such as by means of one or more keys located in appropriate slots in the bracket and on the shaft, but I do not desire to be limited to any particular means in this respect. Each of the preceding pinions engages with a pinion centered on drive shaft 17, namely, with a pinion 21 and a pinion 24. Pinion 24 is integral with a large gear 25 and is supported by a plate 26 of the casing end 29 by means of a bearing 27 and also by shaft 17 by means of a bearing 23. Pinion 21, integral with a gear 20, is supported by an end plate 19 upon casing 3 by means of a bearing 18 and centered on the drive shaft 17 by a bearing 12. A bearing 28 is moreover interposed between the casing end 26 and shaft 17.

The propeller shafts of which 13 designates that for the more distant propeller and 9 that for the nearer propeller, are respectively driven by two gears 7 and 2 engaged by the mentioned gears 25 and 20. The propeller shaft 9 is supported by two bearings 1 and 4, which are secured in the end plate 19 and casing proper 3 enclosing the gearing, while the second propeller shaft 13 is supported by the two bearings 6 and 8, and is preferably also provided with a guide (not shown in the drawing) which ensures its centering with respect to the shaft 9 near the end of said shaft. A cross-piece 5 rigidly joins the bearings 4 and 6.

As the power is applied to drive shaft 17, the same rotates and this simultaneously rotates the bracket 22 fixed on said shaft and therewith also the bushing 14 and the pinions 10 and 11 rotatable on said bushing. These pinions are of different sizes and mesh with pinions 21 and 24 which are also of different sizes in opposite order and rigid with a gear 20 and a relatively larger gear 25, respectively, the resistance to rotation offered by the propeller shafts 9 and 13 through the large gear 2 meshing with gear 20 and the relatively smaller gear 7 meshing with gear 25 setting up a reaction point between pinions 10 and 11 due to their being secured together by member 15. These pinions thus rotate together and cause the gears 20, 21 and 2 to be driven oppositely to gears 24, 25 and 7, with the result that propeller shafts 9 and 13 will revolve in opposite directions.

In other words, inasmuch as the bracket is rotated positively by the drive shaft in clockwise direction, when considered from the right side of Fig. 1, gear 10 will naturally be carried along about the axis of shaft or torsion rod 15. However, due to the fact that gears 10 and 11 connected by rod 15 are of different sizes and that the pinions 21 and 24 with which they respectively mesh are also of different sizes in reverse order, the rotation of the bracket will cause gear 11 to planetate about the axis of drive shaft 17 and rotate pinion 24 also in clockwise direction. The pinion 10, meshing with pinion or gear 21 will naturally rotate clockwise with pinion 11, but as it is of greater diameter than the latter and also larger than gear 21 with which it meshes, it will itself have a greater peripheral speed of rotation than that of pinion 11, and said gear 10 will rotate pinion 21 in counterclockwise direction, due to the differential torque set up in the system.

Should the pinion 21 be held fast, gear 10 would planetate clockwise about the same and by rotating pinion 11 therewith, would cause the latter in meshing with gear 24 to rotate said gear in clockwise direction. In actual fact, pinion 21 is not stationary, but is rotated in counterclockwise direction. The pinion 21 being rigid with gear 20 which meshes with gear 2 on propeller shaft 9 will in its rotation be counterbalanced by the oppositely rotating gear 24 rigid with gear 25 which meshes with gear 7 on the other propeller shaft 13, while the propellers (not shown) mounted on these shafts will present substantially equal resistances to rotation and also supply a balancing momentum for the system as a whole.

However, a certain resiliency present in member 15, which is a torsion rod, will tend to prevent chattering or jarring due to play or back lash between the gears by resiliently taking up such play during operation.

It will readily be seen that the mechanism fulfills its purpose in driving the two propeller shafts in opposite directions, balancing the reaction couple by means of simple geometrical conditions between the ratio of the different gears, with the express reservation that the pinions 10 and 11 have different original diameters, for in case of their being of equal diameters, this would correspond to an infinite reduction.

As has already been indicated, the invention lends itself to an embodiment utilizing normal spur gears; it may however be advantageous in certain cases to use helicoidal teeth for the pinions 7 and 24, for the purpose of eliminating the play which is taken up by the elastic effect of the one or more torsion rods 15 from between the other pinions of the apparatus.

It is clear that the present reduction gear is also adapted for direct mounting on the nose of an airplane engine as well as to mounting the same at a distance therefrom through appropriate transmission. Also, the propellers may be used as tractor or propulsive airscrews without departing from the scope of the invention.

Having now fully described my invention, I claim:

1. In an airscrew system having a pair of coaxial propeller shafts and a drive shaft common to both propeller shafts and spaced parallel thereto, said drive shaft transmitting its rotation through gearing to said propeller shafts, said gearing being provided with a satelite carrier secured upon the drive shaft so as to rotate positively therewith, the combination of a frame or bracket forming the satellite carrier and having pinion bearing means fixed thereon, a pair of alined pinions spaced apart and supported by said bearing means so as to be freely rotatable with respect to the same about an axis substantially parallel to that of the drive shaft, a resilient means interconnecting said pair of alined pinions, additional rotatable gears meshing respectively with each of said pinions, and further rotatable gears independently communicating rotation of said additional gears simultaneously to each of said coaxial propeller shafts.

2. In an airscrew system having a pair of coaxial propeller shafts and a drive shaft common to both propeller shafts and spaced parallel thereto, said drive shaft transmitting its rotation through gearing to said propeller shafts, said gearing being provided with a satellite carrier secured upon the drive shaft so as to rotate positively therewith, the combination of a frame or bracket forming the satellite carrier, bushing means secured upon said frame or bracket, a pair of alined pinions spaced apart and mounted upon said bushing means so as to be freely rotatable thereon about an axis substantially parallel to that of the drive shaft, a resilient means interconnecting said pair of alined pinions through said bushing means, additional rotatable gears meshing respectively with each of said pinions, and further rotatable gears independently communicating rotation of said additional gears simultaneously to each of said coaxial propeller shafts.

3. In an airscrew system having a pair of coaxial propeller shafts and a drive shaft common to both propeller shafts and spaced parallel thereto, said drive shaft transmitting its rotation through gearing to said propeller shafts, said gearing being provided with a satellite carrier secured upon the drive shaft so as to rotate positively therewith, the combination of a frame or bracket forming the satellite carrier and having pinion bearing means fixed thereon, a pair of alined pinions spaced apart and supported by said bearing means so as to be freely rotatable with respect to the same about an axis substantially parallel to that of the drive shaft, a torsion rod interconnecting said pair of alined pinions through said bearing means, additional rotatable gears meshing respectively with each of said pinions, and further rotatable gears independently communicating rotation of said additional gears simultaneously to each of said coaxial propeller shafts.

4. In an airscrew system having a pair of coaxial propeller shafts and a drive shaft common to both propeller shafts and spaced parallel thereto, said drive shaft transmitting its rotation through gearing to said propeller shafts, said gearing being provided with a satellite carrier secured upon the drive shaft so as to rotate positively therewith, the combination of a frame or bracket forming the satellite carrier and having pinion bearing means fixed thereon, a pair of alined pinions spaced apart and supported by said bearing means so as to be freely rotatable with respect to the same about an axis substantially parallel to that of the drive shaft, a resilient means interconnecting said pair of alined pinions, a gear secured upon each of the coaxial propeller shafts, a rotatable gear means meshing with one of said pinions and with the one gear upon one propeller shaft, and a further rotatable gear means meshing with the other of said pinions and with the other gear upon the other propeller shaft.

5. In an airscrew system having a pair of coaxial propeller shafts and a drive shaft common to both propeller shafts and spaced parallel thereto, said drive shaft transmitting its rotation through gearing to said propeller shafts, said gearing being provided with a satellite carrier secured upon the drive shaft so as to rotate positively therewith, the combination of a frame or bracket forming the satellite carrier and having pinion bearing means fixed thereon, a pair of alined pinions spaced apart and supported by said bearing means so as to be freely rotatable with respect to the same about an axis substantially parallel to that of the drive shaft, a resilient means interconnecting said pair of alined pinions, a gear secured upon each of the coaxial propeller shafts, a gear means mounted to rotate about the drive shaft and meshing with one of said pinions and with the one gear upon one propeller shaft, and a further gear means also mounted to rotate about said drive shaft and meshing with the other of said pinions and with the other gear upon the other propeller shaft.

6. In an airscrew system having a pair of coaxial propeller shafts and a drive shaft common to both propeller shafts and spaced parallel thereto, said drive shaft transmitting its rotation through gearing to said propeller shafts, said gearing being provided with a satellite carrier secured upon the drive shaft so as to rotate positively therewith, the combination of a frame or bracket forming the satellite carrier and having pinion bearing means fixed thereon, a pair of alined pinions spaced apart and supported by said bearing means so as to be freely rotatable with respect to the same about an axis substantially parallel to that of the drive shaft, a resilient means interconnecting said pair of aligned pinions, a gear secured upon each of the coaxial propeller shafts, a hollow pinion meshing with one of said pair of pinions, a hollow gear rigidly secured to said hollow pinion and meshing with the one gear upon one propeller shaft, a second hollow pinion meshing with the other of said pair of pinions, and a further hollow gear rigidly secured to the second hollow pinion and meshing with the other gear upon the other propeller shaft, the hollow pinions and the respective hollow gears rigidly associated therewith being alined axially and mounted for independent rotation.

7. In an airscrew system having a pair of coaxial propeller shafts and a drive shaft common to both propeller shafts and spaced parallel thereto, said drive shaft transmitting its rotation through gearing to said propeller shafts, in combination, a satellite carrier mounted to rotate positively with and about said drive shaft, said carrier having pinion bearings fixed thereon, a pair of alined pinions spaced apart and supported by said bearing means so as to be freely rotatable about an axis substantially parallel to that of the drive shaft, means interconnecting said pair of alined pinions and causing them to maintain substantially the same annular speed of rotation in the course of their travel with said satellite carrier about said drive shaft, said means also including a member adapted to resiliently receive and absorb torsional stresses due to opposing forces imposed on said pinions, a gear mounted for positive rotation with each of said coaxial propeller shafts, and gear means establishing a driving connection between one of said pinions and the one gear associated with one of said propeller shafts, and a further gear means establishing a driving connection between the other of said pinions and the other gear associated with the other propeller shaft.

8. In an airscrew system having a pair of coaxial propeller shafts and a drive shaft common to both propeller shafts and spaced parallel thereto, said drive shaft transmitting its rotation through gearing to said propeller shafts, in combination, a satellite carrier mounted to rotate positively with and about said drive shaft, said carrier having pinion bearings fixed thereon, a pair of alined pinions supported by said bearing means so as to be freely rotatable about an axis substantially parallel to that of the drive shaft, said pinions differing in size, means forming a torsionally resilient interconnection between said pair of alined pinions, and additional rotatable gears meshing respectively with each of said pinions, said additional rotatable gears being of different sizes in opposite order to the pinions respectively meshing therewith, whereby rotation of said drive shaft causes opposing forces to be set up between the two pinion-gear combinations and the like elements of such combinations to rotate in opposite directions, and further rotatable gears for transmitting rotation of said additional gears simultaneously to each of said coaxial propeller shafts.

PIERRE ERNEST MERCIER.